June 29, 1926.
G. SCHUSTARICH
1,590,651
COMBINATION PRECISION MEASURING INSTRUMENT
Filed Dec. 20, 1920   3 Sheets-Sheet 1
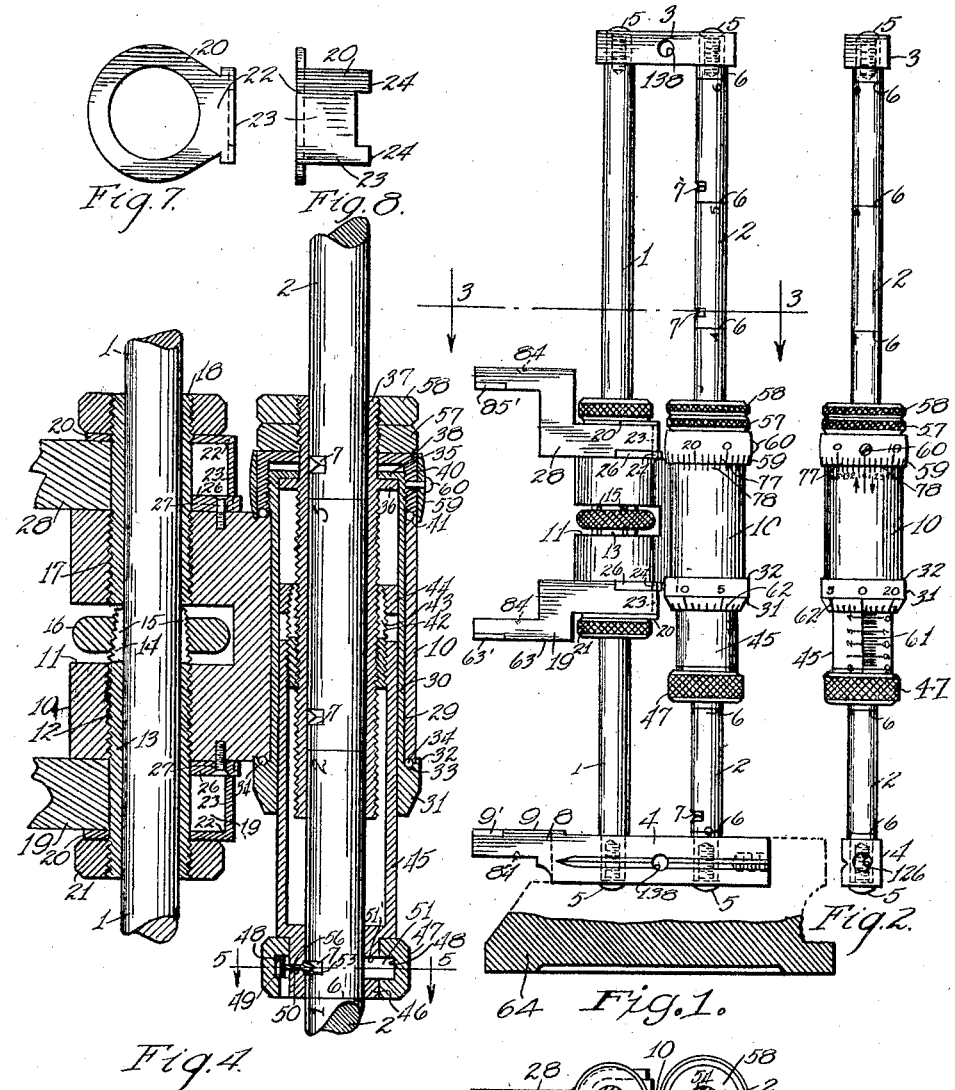
INVENTOR
G. Schustarich
BY Munn & Co.
ATTORNEYS June 29, 1926.
G. SCHUSTARICH
1,590,651
COMBINATION PRECISION MEASURING INSTRUMENT
Filed Dec. 20, 1920   3 Sheets-Sheet 2
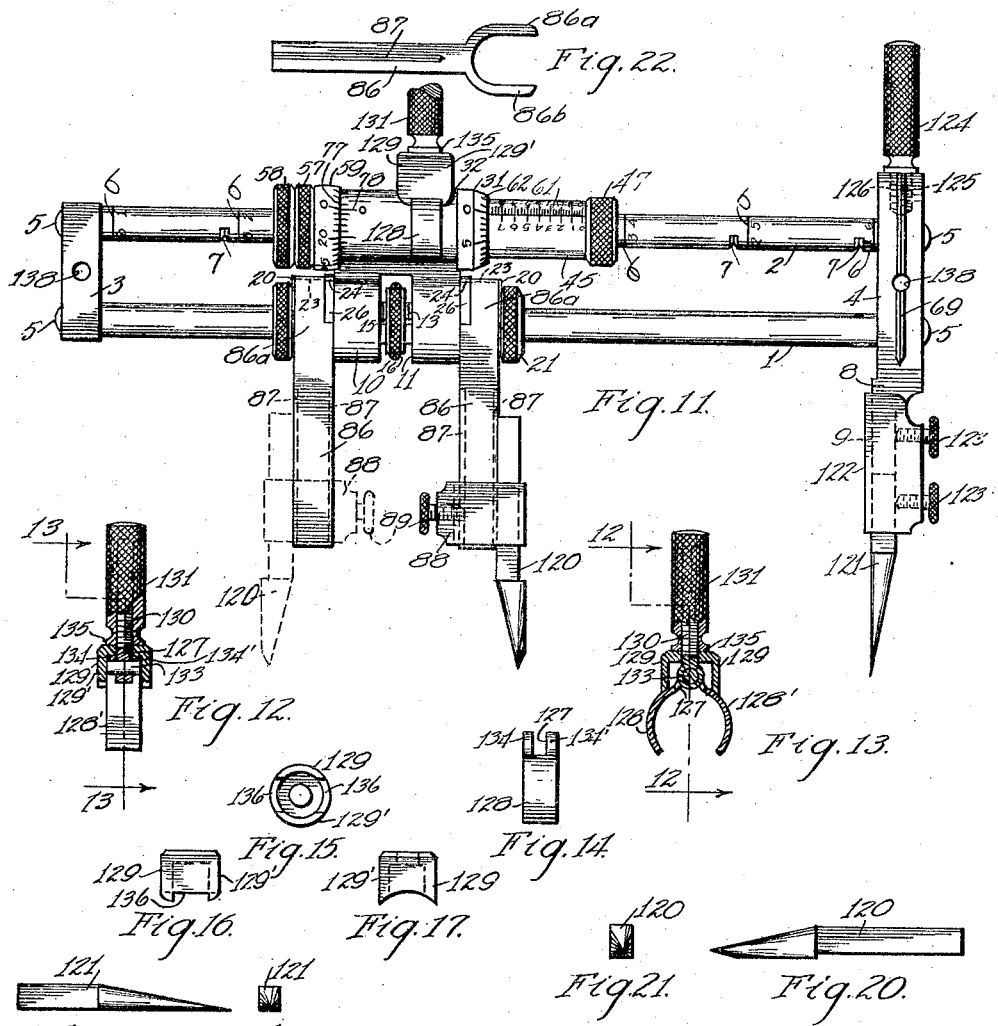
INVENTOR
G. Schustarich
BY 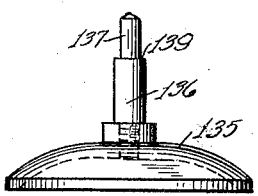
ATTORNEYS

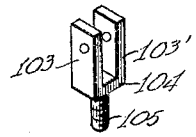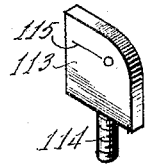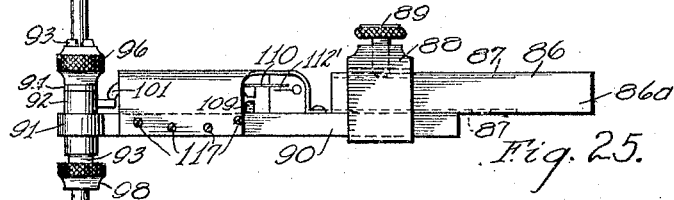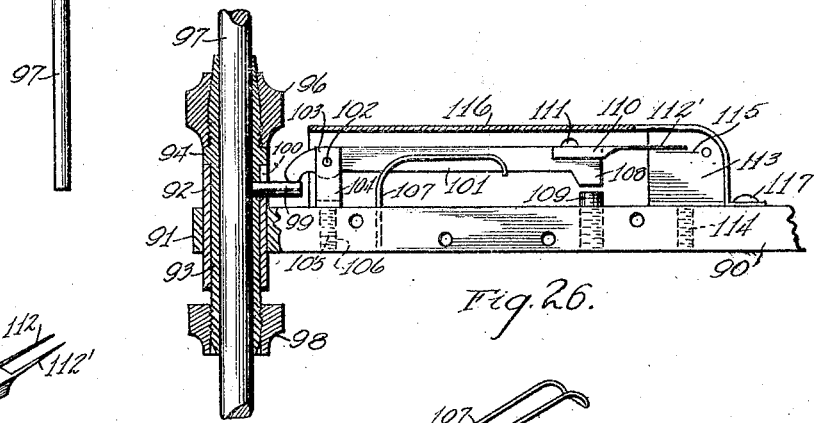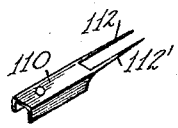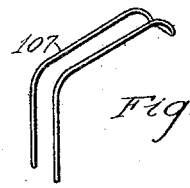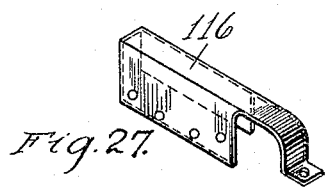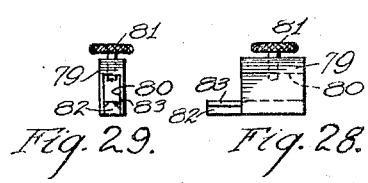

Patented June 29, 1926.

1,590,651

UNITED STATES PATENT OFFICE.

GEORGE SCHUSTARICH, OF CHICAGO, ILLINOIS.

COMBINATION PRECISION MEASURING INSTRUMENT.

Application filed December 20, 1920. Serial No. 431,983.

My invention relates to improvements in combination precision measuring instrumens, and it consists in the combinations, constructions, and arrangements herein described and claimed.

An object of my invention is to provide a combination precision measuring instrument that combines in one device a plurality of measuring instruments ordinarily manufactured separately.

A further object of my invention is to provide a device of the type described that can be used successively as micrometer calipers, outside calipers, inside calipers, dividers, in laying out work, as a scriber, a height gauge, and as a depth gauge.

A further object of my invention is to provide a device of the type described that can be adjusted quickly and readily to accurately indicate the desired results when used in performing the functions for which intended.

A further object of my invention is to provide in a device of the type described a novel form of depth gauge.

A further object of my invention is to provide a device of the type described that has a relatively large capacity for an instrument of its particular size.

A further object of my invention is to provide a device of the type described that is relatively simple in construction and operation, not likely to get out of order easily, and thoroughly practical commercially.

Other objects and advantages will appear in the following specification, and the novel form of the device will be particularly pointed out in the appended claims.

My invention is illustrated in the accompanying drawings, forming part of this application, in which—

Figures 1 and 2 are side and rear elevational views of a portion of the device,

Figure 3 is a section along the line 3—3 of Fig. 1,

Fig. 4 is an enlarged sectional view of a fragmentary portion of the mechanism shown in Fig. 1, Fig. 5 is a section along the line 5—5 of Fig. 4, Fig. 6 is a view partly in section of a fragmentary portion of the mechanism shown in section in Fig. 4, Figures 7 and 8 are views of a portion of the mechanism shown in section in Fig. 4, Figures 9 and 10 are similar views of other portions of the mechanism shown in section in Fig. 4, Figure 11 is a view in elevation illustrating an application of a portion of the device, Figure 12 is a section along the line 12—12 of Fig. 13, Fig. 13 is a section along the line 13—13 of Fig. 12, Figures 14, 15, 16, and 17 are views of certain elements shown in section in Figures 12 and 13, Figures 18 and 19 are views of a portion of the mechanism shown in Fig. 11, Figures 20 and 21 are similar views of another portion of the mechanism shown in Fig. 11, Fig. 22 is a view of still another portion of the mechanism shown in Figure 11, Figs. 23 and 24 are views of a standard used in connection with the instrument shown in Figs. 1 to 11, inclusive, in the adaptation of the same as a bench measuring instrument, Fig. 25 is a side elevational view showing an application of a portion of the device, Fig. 26 is a similar view enlarged and partly in section, Figures 27, 30, 31, 32 and 33 are views showing elements of the apparatus shown in Figures 25 and 26, Figures 28 and 29 are views of an element of the apparatus shown in Fig. 1, Figures 34 and 35 are views of an element used with the portion of the device shown in Fig. 11.

Referring now to Figures 1 to 11 inclusive, I provide a pair of similar shafts 1 and 2 spaced apart and connected at their ends by cross pieces 3 and 4, screws 5 being used to effect the connection. The shaft 2 has marked thereon a plurality of graduations 6 spaced one inch apart and each appropriately designated. A plurality of vertically alined notches 7 is provided in the shaft 2, each notch being positioned a spaced distance above one of the graduations 6.

The cross piece 4 has an integral laterally extending portion 8 formed with a plane surface 9 horizontally alined with the first graduation on the shaft 2. The extension 8 serves as a stationary jaw A carrying block 10 is arranged for movement along the shafts 1 and 2 as will be hereinafter set forth. The carrying block 10 has a horizontal recess 11 and a threaded vertical bore 12 extending downwardly from the lower wall of the recess 11. A short nipple 13 is screwed into the threaded bore 12 and has its upper end 14, projecting within the recess 11 tapered, the same being split at 15. A nut 16, screwing on the tapered end 14, provides a means for clamping the split nipple tightly to the shaft 1 to prevent movement of the nipple 13 and consequently of the carrying block therealong. The carrying block 10 has also a vertical threaded bore 17 extending upwardly from the upper wall of the recess 11 and registering with the threaded bore 12. A second short nipple 18 is slidably disposed on the shaft 1 and has its lower end in threaded engagement with the vertical bore 17. A jaw member 19 is mounted on the body portion of the nipple 13 and is maintained thereon by a washer 20 and a nut 21. The washer 20 is provided with an extension 22, as best seen in Figures 4 and 7, this extension having a portion 23 bent at right angles thereto and fashioned with lugs 24 adapted to enter slots 25 in a keeper plate 26 (see Figures 4, 8, 9, and 10) that is secured to the carrying block 10 by a screw 27, wherefore the jaw member 19 is prevented from rotating on the nipple 13. A second jaw member 28 is mounted on the body portion of the nipple 18. The means employed to maintain the jaw member 28 on the nipple 18 and to prevent movement of the same relative the nipple 18 are precisely identical with the aforesaid means for maintaining the jaw member 19 on the nipple 13 and consequently have been denoted by like reference numerals and require no further description. The carrying block 10 is fashioned with another vertical bore 29 adapted to receive a thimble 30 having an enlarged lower end portion 31, thereby defining an annular shoulder 32 formed with a ball race 33 in which work ball bearings 34. The thimble 30 has an inwardly extending flange 35 at its upper end arranged to overlie an annular rib 36 that is integral with a sleeve 37 that is threaded as shown and serves as the micrometer screw in the device. A cap 38 having a central opening projecting over the upper end of the sleeve 37 has its cylindrical portion 40 threaded interiorly for engagement with the exteriorly threaded upper end of the thimble 30. The cap 38 has its cylindrical portion bearing against the carrying block 10, being supported thereon preferably anti-frictionally, as at 41. A tapered sleeve 42 threaded interiorly for engagement with the threaded sleeve 37 is screwed on the latter to a point intermediate the ends thereof. The tapered sleeve 42 is also peripherally threaded and an end portion thereof split at 43. The screw threaded straight portion of the sleeve 42 is screwed into fixed position in the barrel 45 so that as the sleeve 37 and its thimbles 31 are rotated a longitudinal movement will be imparted to the barrel 45 through said sleeve 42. A screw threaded collar or nut 44 screws upon the tapered end of the sleeve 42 to take up any play or lost motion in the screw threaded connection between the sleeves 37 and 42 aforesaid. The barrel 45 above referred to has its upper end projected within the lower end of the thimble 29 and threaded interiorly for engagement with the threaded sleeve 42. A sleeve 47 is mounted on an inwardly offset end portion 46 of the barrel 45. The sleeve 47 has an annular slot 48 in its inner wall adapted to house the arcute body portion 49 of a detent having a shank 50 projected through the enlarged end portion 55 of a horizontally extending slot 56 in the wall of the offset portion 46, the head thereof 53 being received in a selected one of the notches 7, wherefore the barrel 45 is locked in adjusted position along the shaft 2. A pin 51 projects into an opening 51' in the offset end portion 46, while a second pin 52 extending through the wall of the offset end portion of the barrel 45 has its end disposed in a vertical groove 54 in the shaft 2 extending the length thereof. Consequently, the engagement of the pin 51 with the wall of the annular slot 48 serves to hold the sleeve 47 in place while permitting its rotation relative the offset end portion 46, thereby preventing retraction of the head of the detent through the enlarged end 55 of the slot 56. The pin 52 guides the barrel 45 in its movement along the shaft 2. For convenient dismemberment of the parts just described, the sleeve 47 will have a radial orifice 51'' in its wall for the insertion of a push pin by which the aforesaid pin 51 may be pushed into the bore of the end portion 46 of the barrel 45, after the shaft 2 has been removed from said bore.

In order to move the barrel 45 and the parts carried thereby from one of the notches 7 to another notch, the sleeve 47 is turned until the head 53 of the detent is received with in the vertical slot 54 in which the point of the pin 52 is disposed. The barrel 45 may then be moved along the shaft 2 and is secured in adjusted position when the head of the detent is guided into a selected one of the notches 7.

An adjusting nut 57 and companion locking nut 58 are fitted on the threaded upper end of the sleeve 37, to effect an accurate assembly of the parts on the shaft 2 and the holding thereof in proper operative relation during continued use. A ring 59 concentric with the cylindrical portion 40 of the cap 38, is secured thereto by a headless screw 60 and has its lower end projecting beyond the end of the cylindrical portion 40, as shown, to prevent displacement of the antifriction bearings at 41. The inner end of the screw 60 is preferably tapered and has engagement in a V shaped groove extending around the circumference of the cap portion 40, and is adapted to maintain the ring 59 in proper fixed relation to said cap portion 40 after an adjustment of the ring has been made to bring the hereinafter described zero points of the scales or graduations on the ring 59 and barrel 10 into register.

The barrel 45 has marked thereon a scale indicated generally at 61 whose unit may be any predetermined fractional part of the unit of the scale marked on the shaft 2, which in the form of the device illustrated, is one inch. The scale 61 comprises duplicate graduations which may be read either upwardly or downwardly therealong. The enlarged lower end portion 31 of the thimble 30 is also provided with a scale indicated at 62 whose unit is a fractional portion of the unit of the scale 61. Consequently in using the device as a micrometer caliper, measurements may be ascertained with great precision, since the barrel 45 is first adjusted in a notch 7 with respect to one of the graduations 6. For instance, when set to the first notch 7, with the micrometer scales registering zero, the plane surfaces 9 and 63 of the jaws will contact, and in like manner when the barrel 45 is adjusted to any other notch 7 along the shaft 2 and the micrometer scales registering zero, the exact dimension of the space between the contact surfaces 9 and 63 of the jaws will be that indicated by the graduation numeral of the notch 7 on shaft 2 to which the barrel 45 is locked. The thimble 29 is then advanced along the barrel by turning the same until the measurement may be exactly ascertained by adding results indicated on the scales 61 and 62 to that indicated by the adjusted position of the barrel 45 on the shaft 2. If the thimble 29 is moved downwardly along the barrel 45, the result may be obtained with equal accuracy. Since the jaw member 28 is spaced a known distance from the jaw 63, the former may be used in conjunction with the stationary jaw 8 in taking measurements in the manner set forth.

The ring 59 has delineated thereon a scale 77 having the same unit as and reading in the opposite direction to the scale 62 on the thimble 29. Indicating marks 78 denoting ten-thousandths of an inch are provided on the carriage 10 to register with the graduations on the scale 77. Reference is had to the scale 77 when the removable jaws are being moved toward the stationary jaw member 8 in performing the several functions of the form of the device shown in Figure 1 for which the same is intended.

In order to conveniently perform certain of the operations for which the instrument shown in Figs. 1 and 2 is intended, the same will be detachably mounted in any usual manner and by means of its jaw member 4 in a socket recess of a base block 64, formed to rest upon a surface plate and maintain the instrument perpendicular thereto. As so arrayed the instrument may be operated conveniently in performing the functions for which outside calipers are ordinarily used. It may also be used as a height gauge and for marking distances on work. When it is desired to use the same as inside calipers, I mount on a selected one of the jaw members 19 and 28 one of the auxiliary jaw member (see Figures 28 and 29) and mount on the stationary jaw member 8 another one of the same. Each auxiliary jaw member has a body portion 79 provided with a bore 80 that receives the outer end portion of either the jaw member 19 or 28 or the stationary jaw 8, being secured thereon by a set screw 81. An extension 82 to the body portion 79 forms the jaw when the device is used in performing functions of inside calipers. It will be noted that the jaw 82 has its plane surface rounded at 83, the plane surface 9 of the stationary jaw 8 is rounded at 9', the plane surface 63 of the jaw member 19 is rounded at 63' and the plane surface of the jaw member 28 is rounded at 85'. The point of the set screw 81 enters a hole 84 and therefore maintains the auxiliary jaw members in position along the selected one of the jaw members 19 or 28 and the jaw 8. With the arrangement of parts just described, the contact surfaces of the auxiliary jaw members are in line with the contact surfaces 9 and 63 of the main jaw members of the instrument, and the micrometer mechanism will register in a direct manner the dimensions between the contact surfaces of the auxiliary jaws, with an avoidance of the addition of the thickness of the two main jaw members 9 and 63 to the micrometer reading in the use of the instrument for taking internal measurements.

When it is desired to use the form of instrument illustrated in Fig. 1 as a depth gauge, a height gauge, a dividers or a scribing instrument, the jaw members 19 and 28 are removed and tool holding arm 86 substituted therefor. It will be noted that the arm 86 is formed with integral forks 86ª and 86ᵇ adapted to straddle the nipple 13 (see Figs. 4 and 22), wherefore the same may be secured in position therealong in the same manner as the jaw members 19 and 28. An extension 90 is secured to the arm 86 by means of a clamping sleeve 88 and a set screw 89 having its point projected into a groove 87 in the arm 86. The outer end of the arm 90 is formed into a collar 91. Fast within the collar 91 is a sleeve 92, in which is slidably disposed a nipple 93 having an annular rib 94 overlying and supported by the upper end of the nipple 93 (see Figures 30 and 31). The upper threaded end of the nipple 93 is tapered and split. A nut 96, screwing thereon, provides a means for maintaining a contact rod 97 in adjusted position relative to the arm 90. A nut 98, screwing on the threaded lower end of the nipple 93 determines the extent of movement of the nipple 93 relative to the sleeve 92. A pin 99 having its inner end secured in the wall of the nipple 93 projects through a vertical slot 100 in the wall of the sleeve 92 and limits the downward movement of the outer end of a rocker arm 101 that is pivoted at 102 between the upstanding lugs 103 and 103' of a bracket 104. The latter has a threaded shank 105 adapted for engagement with a threaded opening 106 in the arm 90. A spring 107 bearing against the rocker arm 101 intermediate its length tends to move the inner end thereof upwardly and therefore maintains the outer end of the rocker arm in constant contact with the pin 99. A stop pin 109 secured in the arm 90 contacts with an extension 108 to the rocker arm 101 when the inner end thereof is moved downwardly and limits such movement. An indicator 110 secured to the inner end of the rocker arm 101 by a screw 111 or the like is formed with spaced apart pointers 112 and 112' positioned to move in vertical planes adjacent opposite sides of a vertical guide plate 113 that has an integral shank 114 secured to the arm 90. Horizontal graduations 115 marked on the guide plate 113 are indicated by the pointers 112 and 112' and consequently movement of the contact rod 97 relative the arm 90 is indicated by a movement of the pointers 112 and 112' relative the graduations 115. A housing 116 is secured to the arm 90 by screws 117.

When the device is used as a depth gauge, the contact rod is moved relative the stationary jaw 8, or in other words, the stand 64 by operation of the barrel 45 or the thimble 29 in the manner which has been hereinbefore described. When the lower end of the contact pole 97 contacts with the bottom of the recess to be measured, the pin 99 will at the same time come to a fixed stop in the downward path of the rocker arm 101. Further downward travel of said rocker arm and its accessories, by means of the micrometer mechanism, will cause a rocking movement of said arm on its pivot 102, and in such rocking movement the pointer 112, 112' moves downwards towards the zero mark or line 115, to indicate to the operator the time for taking an instrument reading. Such movement of the rocker arm 101 is due to the fact that its shorter end has abutment or rest upon the aforesaid pin 99, and with such arrangement, the reading of the micrometer should only be taken after the aforesaid pointer 112, 112' registers with the zero mark 115 on the dial 113.

In that the main shaft or rail 2 carries scales reading in reverse directions along its length, and the micrometer carries scales reading in like reverse directions, either side of the instrument may be viewed in taking readings, etc., as found most convenient for a clear and convenient observation of said scales as well as of the indicator 110 and regardless of the directions in which the adjustment of the micrometer mechanism operates. When effecting an adjustment of the instrument it is only necessary to loosen the fastening means of the shaft or rail 2 in the cross-pieces 3, 4, then impart to said shaft and the micrometer mechanism mounted thereon the required degree of rotation to bring the readings of the scales in view at the required side of the instrument, and then secure the shaft 2 fixedly to the cross pieces 3, 4. When the device is used as a height gauge in laying out work, as by marking distances thereon, I clamp a marking tool 118 having one end beveled to a sharp edge 119 on the arm 86 by means of the clamping sleeve 88 and the set screw 89, as hereinbefore described. When it is desired to use the device as a scriber or as dividers, I mount a center point 120 on the arm 86 that is mounted on the nipple 13 in the position formerly occupied by the jaw member 19. In mounting the center point 120, I make use of the clamping sleeve 88 and the set screw 89. I then mount on the jaw member 8 a scribing tool 121 by means of a clamping sleeve 122 and set screws 123 (see Figure 11). A knurled handle 124 having a threaded shank 125 engaged with a threaded bore 126 in the cross piece 4, provides a convenient means for operating the device. A clamping member having curved arms 128 and 128' and a slot 127 therethrough intermediate its length is secured to the carriage 10, as shown in Figure 11. The arms 128 and 128' are curved to conform with the contour in the adjacent portion of the carriage 10 and are clamped thereto by operation of a knurled cap 131 that screws on a threaded screw 130 having its head formed into an eye through which a pin 133 extends, the ends thereof engaging with the lugs 134 and 134' to maintain the head of the screw between the adjacent portions of the arms 128 and 128'. A cap 131 has a flange 135 at its lower end resting upon the upper surface of a spacing member 129. The cylindrical portion 129' of the spacing member 129 is slotted at 136 and is disposed as shown in Figs. 12 and 13 as that movement thereof moves the arms 128 and 128' into operative engagement with the carriage 10. When the form of the device just described is not in use, I provide a rest or stand for supporting the same in order to preclude injury to the parts of the device. A stand 135 is formed with a standard 136 having a reduced upper portion 137 adapted to enter one of the openings 138 that extends transversely through the cross pieces 3 and 4. A shoulder 139 defined by the reduction of the upper portion of the standard 136 limits the movement of the cross pieces 3 and 4 on the standard. It will be understood that two of these rests or stands 135 will be used in supporting opposite ends of the device. Calipers can then be conveniently set therefrom and light pieces of work can be measured by inserting the same between the contact jaws of the device.

From the foregoing description of the various parts of the device, the operation thereof may be readily understood. It will be obvious that in performing the various operations mentioned, the measurement is made in each instance by moving the carriage 10 toward or away from the cross piece 4, the result being read directly from the scale 6 on the shaft 2 and from the scale 61 on the barrel 45 and the scale 62 on the enlarged end portion of the thimble 29 or from the scale 6 on the shaft 2, the scale 61 on the barrel 45 and the scale 77 on the ring 59, depending upon whether or not the carriage block 10 is being moved away from or toward the cross piece 4, since the scale 61 comprises two sets of indicia, one arranged in ascending series and the other arranged in descending series. The carriage block 10 may be first moved along the shaft 2 until a result is indicated on the shaft 6 that will approximate the result to be obtained. The thimble 29 and the sleeve or micrometer screw 37 are then moved relative the barrel 45 in the manner described until the exact measurement is accomplished, the correct result being then accurately determined by adding the readings from the scale 61 and 62 to the reading from the scale 6 or by adding the readings from the scale 61 and the scale 77 to the reading from the scale 6 depending upon whether or not the carriage block is moved upwardly or downwardly relative the shaft which is also marked to indicate the extent of movement upwardly or downwardly. The results are obtained in each instance by reading directly from the scales marked on the instrument and consequently the use of a vernier scale or of a magnifying glass or the like is obviated. The result is obtained in each instance in the manner set forth above, that portion of the device shown in Figure 1 being changed slighty by necessary additions and substitutions to adapt the portion of the device shown therein to the several uses hereinbefore enumerated.

In the preferred form of the device as shown in Figures 1, 2, and 4 and described in detail herein, the barrel is adjustably secured along the shaft 2 and the carrying block is moved by occasioning movement simultaneously of the thimble 29 and micrometer screw 37 along the barrel, wherefore the movable jaw is moved to measure lengths less than that denoted by the unit of the scale 6 on the shaft 2.

The space or opening between the top of the cap 38 and the flange 35 of the thimble 30, Fig. 4, is to permit adjustment of the cap to the ball-bearings so that the cap grips the thimble onto which it is screwed by the threaded portions only, and when the nuts 57 and 58, Fig. 4, are tightened, the flange of the thimble grips the shoulder 36 of the micrometer screw 37, Fig. 4, securely so that when operating by turning the nuts 57, 58, the micrometer screw and the thimble must turn together as a unit. A further purpose of the above mentioned spaces or openings is to permit re-adjustment of the cap upon the ball-bearings to take up play in the ball-bearings caused by the operation of the device. For the above reason the exterior of the circumference of the cap 38 cannot be graduated for reading because the zero or guide line on the carriage registering with the scale on the ring 59, Fig. 1, is in the center on the carriage and stationary. For this reason I have mounted on the cap 38, Fig. 4, a ring 59 provided with a scale divided into twenty five equal parts and each part or line indicates .001″ as do the scale 62 at the bottom of the thimble 31 and indicate measurements as hereinbefore set forth. Now since the cap 38 is revolved when adjustments of either the jaws or the bearings are made the graduated ring 59 carried on the cap 38 and secured thereto by a screw 60 as shown would be moved therewith and consequently the zero line on the ring 58 would move away from the zero or guide line on the carriage. The cap 38 each has a groove cut around its circumference in which the point of the set screw 60 carried by the ring 59 has engagement for the purpose of holding the rings in adjusted position while still permitting the rings to be rotated. When adjustments are made the zero line on the thimble at the bottom also must coincide with the vertical guide line on the barrel, and then the screw 60 on the ring is tightened.

There are two sets of scales on the carriage registering with the scale on the ring 59. They read in the opposite direction to each other, starting at 0 line, as shown, so that each set has 10 lines. One set is for upward and the other for downward reading as indicated by the arrows in Fig. 2. These 10 lines subdivide the one space .001″ of the scale on the ring 59 into ten equal parts. Any line of this scale 78 registering with one of the lines on the ring 198 indicates as many tenths as the number underneath indicates. For instance, if the line No. 8 registers with one of the lines on the scale 77 there would be eight tenths of one thousandth of an inch to be added to the sum obtained by the other scales.

Since the micrometer screw has 40 threads per inch the scale on the barrel has 40 equal divisions within one inch space so that one complete revolution of the screw with the thimble advances 1/40 of an inch or expressed in decimals .025 inch. Since $$40 \times .025'' = \frac{1000''}{1000}$$

the micrometer screw with the thimble makes 40 complete revolutions to advance one inch. This subdivides one inch or the unit of the scale on the shaft of either form of device into forty equal parts which are .025″ each. This 1/40″ is again subdivided into twenty-five equal parts on the scale on the thimble or ring. The ten divisions on the carriage subdivide nine divisions of the scale on the thimble or ring into ten equal parts, or .001″ is divided into ten equal parts which is indicated by one division space of the scale on the thimble or ring. These are expressed as tenths of .001 inch. In all, the inch or unit is subdivided into 10,000 equal parts.

As many changes on the part of jaws, joints, and other attachments for different uses are possible in the shape, size and arrangement of parts without departing from the spirit of the invention, I do not limit myself to the forms herein shown and described but may make any such changes without in any manner departing from the spirit of the invention or the scope of the subjoined claims. To those familiar with the art, the combination applying the principles hereinbefore set forth and described will be understood. It may be used in all classes of work in which this type of instrument is necessary. This combination precision measuring instrument may also be provided with scales embodying units of the metric system.

I claim:

1. In a device of the character described, a staff having a scale of equal divisions along its length and with complementary recesses in adjacent relation to the scale, a stationary jaw secured to an end of the staff, carrying means movable on said staff, revoluble means mounted on said carrying means and having a turning engagement with one or the other of the recesses in the staff to accurately position the carrying means upon the staff, a movable jaw slidingly mounted on the staff, and means carried by the carrying means for moving said movable jaw in parallel relation to said stationary jaw and having a range of adjustment greater than the distance between any two adjacent recesses in the staff.

2. In a device of the character described, a staff having a scale of equal divisions along its length and with complementary recesses in adjacent relation to the scale, a stationary jaw secured to an end of the staff, carrying means movable on said staff, revoluble means mounted on said carrying means and having a turning engagement with one or the other of the recesses in the staff to accurately position the carrying means upon the staff, a movable jaw slidingly mounted on the staff, means carried by the carrying means for moving said movable jaw in parallel relation to said stationary jaw and having a range of adjustment greater than the distance between any two adjacent recesses of the staff, and means for indicating the extent of said movable jaw relative to a selected recess of the staff.

3. In a device of the character described, a shaft having a straight scale thereon, a stationary jaw secured thereto, carrying means slidably mounted on said shaft, means for selectively locking said carrying means in certain positions along said shaft, a movable jaw, means carried by said carrying means for moving said movable jaw in parallel relation with said stationary jaw, means for securing the movable jaw in adjusted position along said shaft, there being cooperating scales marked on said carrying means and said jaw moving means for indicating in fractions of the unit of said first named scale, the extent of movement of said movable jaw relative a selected graduation of said first named scale.

4. In a device of the character described, a shaft having a scale thereon, a stationary jaw secured thereto, a tool holding arm secured to said stationary jaw, carrying means slidably mounted on said shaft, means for selectively locking said carrying means in certain position along said shaft, a movable tool holding arm, and means carried by said carrying means for movably supporting said movable tool holding arm in parallel relation with said first named tool holding arm.

5. In a device of the character described, a shaft having a scale thereon, a stationary jaw secured thereto, a tool holding arm secured to said stationary jaw, carrying means slidably mounted on said shaft, means for selectively locking said carrying means in certain positions along said shaft, a movable tool holding arm, means carried by said carrying means for movably supporting said movable tool holding arm in parallel relation with said first named tool holding arm, and a plurality of tools for different purposes, each adapted to be secured to either of said tool holding arms, and detachable means for securing said tools to said tool holding arms.

6. In a device of the character described, a shaft having a straight scale thereon, a stationary jaw secured thereto, carrying means slidably mounted on said shaft, means for selectively locking said carrying means in certain positions along said shaft, a movable jaw, means carried by the carrying means for moving said movable jaw in parallel relation with said stationary jaw, a pair of auxiliary jaw members, and means for securing said auxiliary jaw members to said first named jaws, wherefore the device is adapted for use as inside calipers.

7. In a device of the character described, a shaft having a scale thereon, a stationary jaw secured thereto, a tool holding arm secured to said stationary jaw, carrying means slidably mounted on said shaft, means for selectively locking said carrying means in certain positions along said shaft, a movable tool holding arm, means carried by said carrying means for movably supporting said movable tool holding arm in parallel relation with said first named tool holding arm, and a holder for said shaft.

8. In a device of the character described, a shaft having a scale thereon, a stationary jaw secured thereto, a tool holding arm secured to said stationary jaw, carrying means slidably mounted on said shaft, means for selectively locking said carrying means in certain positions along said shaft, a movable tool holding arm, means carried by said carrying means for movably supporting said movable tool holding arm in parallel relation with said first named tool holding arm, an extension carried by said second named tool holding arm, said extension having its outer end formed into a collar, a vertical sleeve fast within the collar, a tubular member slidably mounted in said sleeve and provided with a flange overlying the upper end of said sleeve, means for limiting the upward movement of said tubular member relative to said sleeve, a vertical contact rod extended through said tubular member and adjustably secured thereto, and means for indicating a movement of either said tubular member or said sleeve relative to the other.

9. In a device of the character described, a graduated vertical shaft, a holder therefor, a tool holding arm, means for supporting said tool holding arm on said shaft for movement therealong, an extension carried by said tool holding arm, said extension having its outer end formed into a collar, a vertical sleeve fast in the collar, a nipple slidably mounted in said sleeve and provided with a flange overlying the upper end of the latter, means for limiting the upward movement of said nipple relative to said sleeve, a contact rod extended through said nipple and adjustably secured thereto, a rocker arm pivoted intermediate its length on said extension, and means carried by said nipple for oscillating said rocker arm when said nipple is moved relative to said sleeve.

10. In a device of the character described, a shaft having a scale thereon, a stationary jaw secured thereto, a tool holding arm secured to said stationary jaw, carrying means slidably mounted on said shaft, means for selectively locking said carrying means in certain positions along said shaft, a movable tool holding arm, means carried by said carrying means for movably supporting said movable tool holding arm in parallel relation with said first named tool holding arm, a pair of marking tools, each having a sharp edge, and detachable means for securing said marking tools to said tool holding arm.

11. In a device of the character described, a shaft having a scale thereon, a stationary jaw secured thereto, a tool holding arm secured to said stationary jaw, carrying means slidably mounted on said shaft, means for selectively locking said carrying means in certain positions along said shaft, a movable tool holding arm, means carried by said carrying means for movably supporting said movable tool holding arm in parallel relation with said first named tool holding arm, a center point, means for securing said center point to said movable tool holding arm, a scribing tool, and means for securing said scribing tool to said stationary tool holding arm.

12. In a device of the character described, a pair of shafts, a straight scale marked on one of said shafts, cross pieces connecting said shafts at their ends for maintaining said shafts spaced apart and in parallel relation, a stationary jaw integral with one of said cross pieces, carrying means slidably mounted on said shaft, means for selectively locking said carrying means to the shaft having the scale marked thereon in predetermined positions relative certain graduations in said scale, a movable jaw, and means connecting with said carrying means for movably supporting said movable jaw in parallel relation with said stationary jaw.

13. In a device of the character described, a pair of shafts, a straight scale marked on one of said shafts, cross pieces connecting said shafts at their ends for maintaining said shafts spaced apart and in parallel relation, a stationary jaw integral with one of said cross pieces, carrying means slidably mounted on said shaft, means for selectively locking said carrying means to the shaft having the scale marked thereon in predetermined positions relative certain graduations in said scale, a movable jaw, means connecting with said carrying means for movably supporting said movable jaw in parallel relation with said stationary jaw, and means for locking said last named means in adjusted position relative certain graduations in said scale.

14. In a device of the character described, a pair of shafts, a straight scale marked on one of said shafts, cross pieces connecting said shafts at their ends for maintaining said shafts spaced apart and in parallel relation, a stationary jaw integral with one of said cross pieces, carrying means slidably mounted on said shaft, means for selectively locking said carrying means to the shaft having the scale marked thereon in predetermined positions relative certain graduations in said scale, a movable jaw, means connecting with said carrying means for movably supporting said movable jaw in parallel relation with said stationary jaw, means for locking said last named means in adjusted position relative certain graduations in said scale, a holder provided with a socket adapted to receive said integral piece and stationary jaw, and means for securing the latter in said socket.

15. In a device of the type described, a shaft having notches therein, a carrying means slidably mounted on said shaft, means carried by said carrying means and adapted to enter any one of said notches to lock said carrying means in adjusted position, and means for moving said carrying means so as to bring the locking means into binding engagement in the slot in which it is disposed.

16. In a device of the type described, a shaft having notches therein, a jaw actuating member slidably carried by said shaft, a locking member carried by said jaw actuating member and being adapted to enter any one of said notches, and means being carried by said jaw actuating member for moving said locking member into binding engagement in the notch in which it is disposed.

17. In a device of the type described, a shaft having notches on one side thereof, a jaw actuating member slidably carried by said shaft, a locking member carried by said jaw actuating member and being adapted to enter said notches, an arm pivoted to said jaw actuating member, said shaft having notches in its other side, and means carried by said arm and being adapted to enter any one of said second named set of notches, said means when actuated being adapted to move said jaw actuating member so as to cause said locking member to have binding engagement in the notch in which it is disposed.

18. In a device of the type described, a shaft, a jaw slidingly carried by said shaft, a jaw moving member slidably carried by said shaft, means connecting said member with said jaw and being adapted to move said jaw with respect to said member, a scale on said jaw, moving means for indicating the extent of movement of said jaw with respect to said member, and means for locking said jaw to said shaft after it has been moved by said means.

19. In a device of the type described, a support, a movable jaw carried by said support, a micrometer carrying member carried by said support, a micrometer carried by said member and comprising a bar connecting said member with said jaw, said bar having a scale reading in two directions, a thimble carried by said member and being adapted to move said bar the distance of one graduation on said scale when rotated through one revolution, said thimble having a scale thereon, and a ring carried by said thimble adapted to move said bar the distance of one graduation on said scale when rotated through one revolution, said ring having graduations thereon numbered in the reverse direction to the numbering on said thimble, whereby a reading from either of said ring or thimble in conjunction with the scale on said bar will give the distance the bar has moved in either direction.

20. In an attachment for measuring devices, a bar, a rod carried by said bar and being adapted to move a slight distance with respect to said bar, and an indicator adapted to be moved when said rod is moved.

21. In an attachment for measuring devices, a bar, a rod, means for gripping said rod at any desired position, and for securing said rod to said bar, said means permitting said rod to move slightly with respect to said bar, and an indicator adapted to be moved when said rod is moved.

22. In an attachment for measuring devices, a bar having a sleeve, a rod slidably mounted in said sleeve, a pin carried by said rod, a spring pressed lever having one of its ends yieldingly held in engagement with said pin, said pin being adapted to swing said lever when said rod is moved with respect to said bar, and an indicator carried by the other end of said lever.

GEORGE SCHUSTARICH.